United States Patent
Shibayama et al.

(10) Patent No.: US 11,925,987 B2
(45) Date of Patent: Mar. 12, 2024

(54) METAL POWDER MANUFACTURING DEVICE, AND CRUCIBLE APPARATUS AND MOLTEN METAL NOZZLE FOR METAL POWDER MANUFACTURING DEVICE

(71) Applicant: Mitsubishi Heavy Industries, Ltd., Tokyo (JP)

(72) Inventors: Takashi Shibayama, Tokyo (JP); Shinya Imano, Tokyo (JP); Shigenobu Eguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 552 days.

(21) Appl. No.: 17/263,739

(22) PCT Filed: Feb. 8, 2019

(86) PCT No.: PCT/JP2019/004616
§ 371 (c)(1),
(2) Date: Jan. 27, 2021

(87) PCT Pub. No.: WO2020/161884
PCT Pub. Date: Aug. 13, 2020

(65) Prior Publication Data
US 2021/0178478 A1  Jun. 17, 2021

(51) Int. Cl.
*B22F 9/08* (2006.01)

(52) U.S. Cl.
CPC ........ *B22F 9/082* (2013.01); *B22F 2009/088* (2013.01)

(58) Field of Classification Search
CPC .............. B22F 2009/0876; B22F 9/082; B22F 2009/0892; B22F 2009/088
(Continued)

(56) References Cited

U.S. PATENT DOCUMENTS 3,309,733 A * 3/1967 Winstrom ............... B22F 9/082
425/7
4,682,717 A * 7/1987 Marino ................. C04B 35/057
501/123
(Continued)

FOREIGN PATENT DOCUMENTS

CN  102528058 A  7/2012
CN  203610671 U  5/2014
(Continued)

OTHER PUBLICATIONS

International Search Report, PCT/JP2019/004616, dated Mar. 26, 2019, 2 pgs.
(Continued)

*Primary Examiner* — Jessee R Roe
*Assistant Examiner* — Michael Aboagye
(74) *Attorney, Agent, or Firm* — Volpe Koenig (57) ABSTRACT

A metal powder manufacturing device includes: an atomization tank; a crucible in which a molten metal is stored; a molten metal nozzle that allows the molten metal stored in the crucible to flow downward into the atomization tank; and a fluid spraying nozzle including a plurality of spraying holes that spray a fluid to an atomization tank side end part of the molten metal nozzle to pulverize a molten metal flow flowing downward from the molten metal nozzle. The molten metal nozzle includes a molten metal nozzle body and an orifice part having an inside diameter equal to or smaller than an inside diameter of the molten metal nozzle body, and a material of the orifice part is harder than a material of the molten metal nozzle body.

16 Claims, 7 Drawing Sheets

(58) Field of Classification Search
USPC .............. 266/202; 425/7, 78; 222/603, 606
See application file for complete search history.

(56) References Cited

U.S. PATENT DOCUMENTS

| | | | | |
|---|---|---|---|---|
| 4,784,302 | A | * 11/1988 | Raman | B22F 9/082 |
| | | | | 425/7 |
| 9,789,545 | B2 | * 10/2017 | Kennedy | B22F 9/082 |
| 10,328,492 | B2 | * 6/2019 | Kaneta | B22F 9/082 |
| 2007/0057416 | A1 | 3/2007 | Kennedy | |
| 2013/0014860 | A1 | 1/2013 | Li et al. | |
| 2017/0239731 | A1 | 8/2017 | Kaneta et al. | |

FOREIGN PATENT DOCUMENTS

| | | | |
|---|---|---|---|
| CN | 105903975 A | 8/2016 | |
| CN | 106891015 A | 6/2017 | |
| CN | 107096921 A | 8/2017 | |
| EP | 0420393 A1 | 4/1991 | |
| GB | 2155049 A | 9/1985 | |
| JP | 62-192506 A | 8/1987 | |
| JP | H05202404 * | 8/1993 | .............. B22F 9/082 |
| JP | 2002-069512 A | 3/2002 | |
| JP | 2006-110610 A | 4/2006 | |
| JP | 2009-035801 A | 2/2009 | |
| JP | 2010-236026 A | 10/2010 | |
| JP | 2011-149073 A | 8/2011 | |
| JP | 2013-527311 A | 6/2013 | |
| JP | 2015-067894 A | 4/2015 | |
| JP | 2016-211027 A | 12/2016 | |

OTHER PUBLICATIONS

International Preliminary Report on Patentability dated Aug. 10, 2021 for PCT International Application No. PCT/JP2019/004616.
Extended European Search Report dated Nov. 17, 2022 for European Patent Application No. 19914642.4.
Chinese Office Action dated Sep. 9, 2022 for Chinese Patent Application No. 201980050030.4.

* cited by examiner

| | MATERIAL OF MOLTEN METAL NOZZLE BODY 12c | MATERIAL OF ORIFICE PART 12d |
|---|---|---|
| EXAMPLE 1 | SILICON NITRIDE | ZIRCONIA |
| EXAMPLE 1 | SILICON NITRIDE | ALUMINA |
| EXAMPLE 3 | SILICON NITRIDE | SILICON CARBIDE |
| EXAMPLE 1 | BORON NITRIDE | ZIRCONIA |
| EXAMPLE 5 | BORON NITRIDE | ALUMINA |
| EXAMPLE 6 | BORON NITRIDE | SILICON CARBIDE |
| EXAMPLE 7 | SILICA | ZIRCONIA |
| EXAMPLE 8 | SILICA | ALUMINA |
| EXAMPLE 9 | SILICA | SILICON CARBIDE |

METAL POWDER MANUFACTURING DEVICE, AND CRUCIBLE APPARATUS AND MOLTEN METAL NOZZLE FOR METAL POWDER MANUFACTURING DEVICE

TECHNICAL FIELD

The present invention relates to a metal powder manufacturing device in which a fluid is sprayed to an atomization tank-side end part of a molten metal nozzle to cause the high-pressure fluid to collide against a melting metal flowing downward from the molten metal nozzle, thereby manufacturing a fine particulate form metal (metal powder), and a crucible apparatus and a molten metal nozzle for the metal powder manufacturing device.

BACKGROUND ART

As a method for manufacturing a fine particle form metal (metal powder) from a melting metal, there are atomizing methods including a gas atomizing method and a water atomizing method. In the gas atomizing method, a molten metal is allowed to flow downward through a molten metal nozzle at a lower part of a solution tank in which the melting metal is stored, and an inert gas is sprayed to the molten metal from a plurality of gas spraying nozzles disposed in the periphery of the molten metal nozzle. The flow of the melting metal from the molten metal nozzle is divided by the inert gas flow from the gas spraying nozzles into a plurality of fine metal droplets, which falls within an atomization tank, to be solidified while being spheroidized by surface tension. As a result, a spherical metal powder is recovered by a collection hopper at a bottom part of the atomization tank.

For example, JP-2016-211027-A discloses a metal powder manufacturing device including: a crucible that is provided at an upper part of an atomization chamber (atomization tank) and holds a molten metal; an atomizing nozzle (molten metal nozzle) that is connected to a bottom part of the crucible and allows the molten metal to fall into the atomization chamber while spraying the inert gas to the molten metal; a plurality of inert gas nozzles (spraying nozzles) that spray a high-pressure inert gas to the molten metal flowing downward through the atomizing nozzle to form a multiplicity of fine metal droplets; a gas introduction port and a gas discharge port for gas replacement in the atomization chamber; and a second gas introduction port for giving a gas for establishing an oxidizing atmosphere and/or a nitriding atmosphere in the atomization chamber.

PRIOR ART DOCUMENT

Patent Document

Patent Document 1: JP-2016-211027-A

SUMMARY OF THE INVENTION

Problem to be Solved by the Invention

In recent years, the need has been increasing for a metal powder having a particle diameter smaller than that of a metal powder conventionally demanded for an atomizing method, inclusive of, for example, a material for a metal three-dimensional printer for forming a metal of a desired shape by stacking a large amount of metal particles. While the particle diameter of conventional metal powders for use in powder metallurgy, welding and the like is on the order of 70 to 100 μm, the particle diameter of the metal powder for use in the three-dimensional printer is very fine, for example, on the order of 20 to 50 μm.

Incidentally, the molten metal nozzle of a metal powder manufacturing device based on the atomizing method includes an orifice part which is a part for controlling the flow rate of a molten metal and is a part thinnest (smallest) in inside diameter. Besides, the molten metal nozzle is generally manufactured from a single material. For example, a comparatively soft material such as boron nitride (BN) has resistance to a shock form thermal stress (thermal shock) due to a sudden temperature change upon pouring of a molten metal, and, therefore, is accompanied by little fear of molten metal leakage. However, since such a material is liable to be abraded by contact with the molten metal, continued use thereof enlarges the diameter of the orifice part, the flow rate of the molten metal increases from an initial value, and the particle diameter of the metal powder may be thereby enlarged. In contrast, a comparatively hard material such as a ceramic is excellent in abrasion resistance, and has such a characteristic that the diameter of the orifice part can be maintained even when the orifice part makes contact with the molten metal repeatedly; since the material is liable to be damaged by thermal shock upon pouring of the molten metal, it is difficult to overcome the fear of molten metal leakage.

In addition, the types of the atomization nozzle of the metal powder manufacturing method based on the atomizing method include a free fall type which is excellent in mass-producibility but poor in fine particle formation property, and a confined type which is excellent in fine particle formation property but poor in mass-producibility. In the case of manufacturing the very fine metal powder as aforementioned, it is preferable to utilize the latter, confined type. A confined type atomization nozzle has a gas spraying nozzle for pulverizing the melting metal by spraying a high-pressure gas to the tip end of the molten metal nozzle, and the gas sprayed from the gas spraying nozzle cools the tip end of the molten metal nozzle. Therefore, in the confined type atomization nozzle, thermal stress distribution in the molten metal nozzle is liable to be uneven as compared to the free fall type, thus countermeasure against thermal shock is more important than in the prior art.

The present invention has been made in consideration of the aforementioned circumstances. It is an object of the present invention to provide a metal power manufacturing device including a confined type atomization nozzle having resistance to thermal shock and excellent in abrasion resistance, and a crucible apparatus and a molten metal nozzle for the metal power manufacturing device.

Means for Solving the Problem

In order to achieve the above object, the present invention provides a metal powder manufacturing device including: an atomization tank; a crucible in which a melting metal is stored; a molten metal nozzle that allows the melting metal stored in the crucible to flow downward into the atomization tank; and a fluid spraying nozzle including a plurality of spraying holes that spray a fluid to an atomization tank-side end part of the molten metal nozzle to pulverize the melting metal flowing downward from the molten metal nozzle, in which the molten metal nozzle includes a molten metal nozzle body, and an orifice part having an inside diameter equal to or smaller than an inside diameter of the molten metal nozzle body, and a material of the orifice part is harder than a material of the molten metal nozzle body.

Advantages of the Invention

According to the present invention, it is possible to provide a metal powder manufacturing device including a confined type atomization nozzle having resistance to thermal shock and excellent in abrasion resistance, and a crucible apparatus and a molten metal nozzle for the metal powder manufacturing device.

MODES FOR CARRYING OUT THE INVENTION

Figure 1:
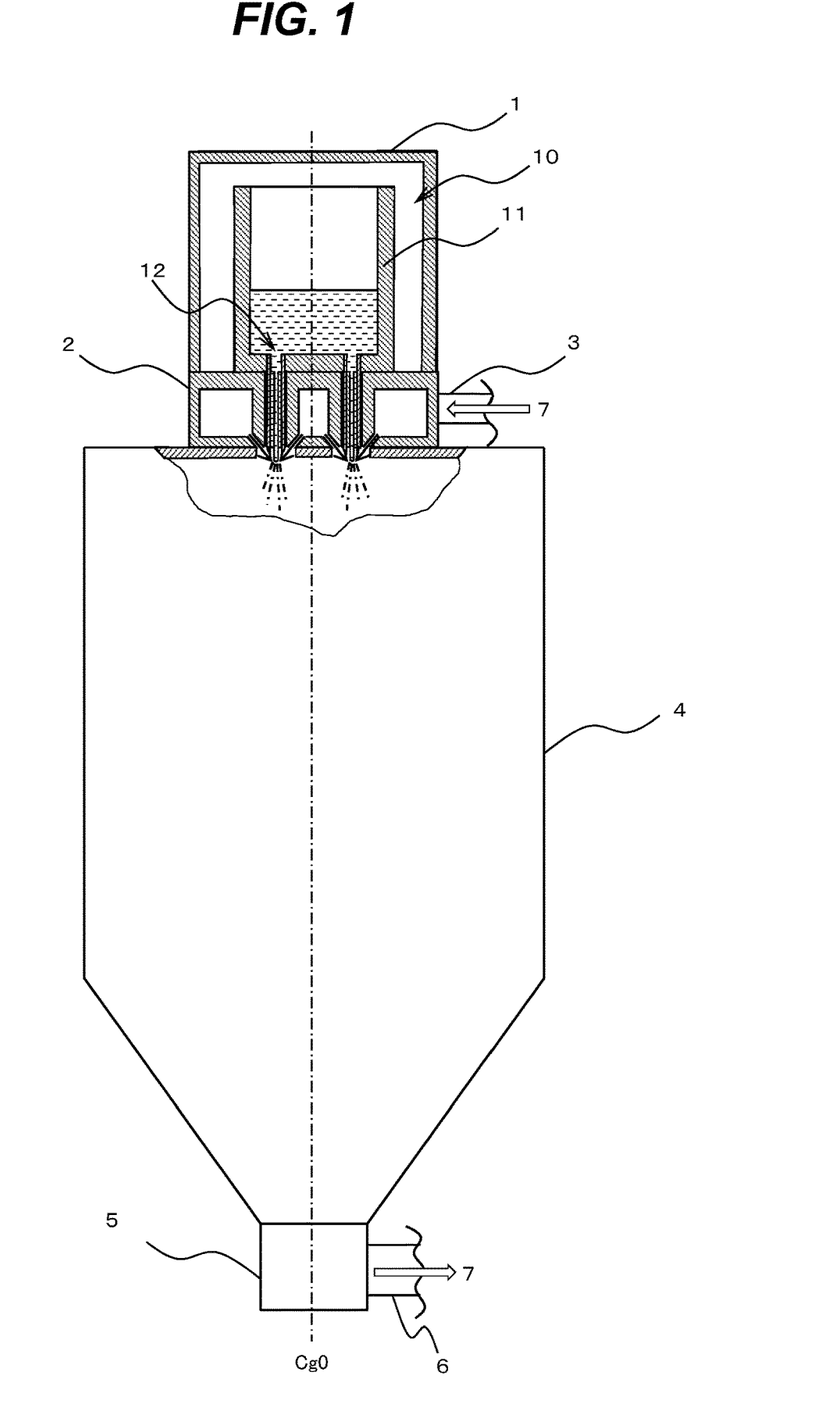
FIG. 1 is an overall configuration view of a metal powder manufacturing device according to a first embodiment in which a solution tank according to the present invention is depicted in section.
Figure 2:
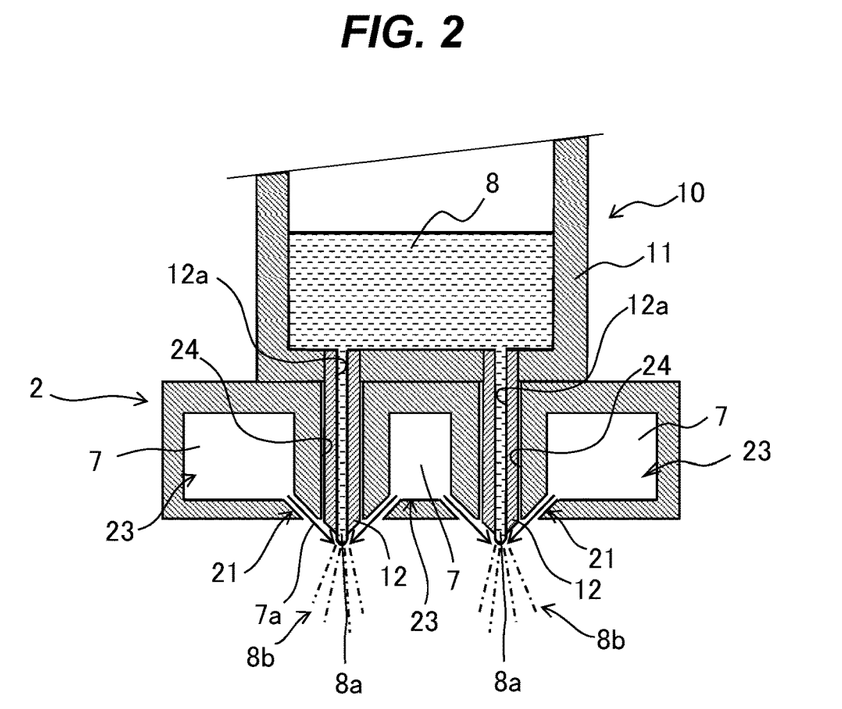
FIG. 2 is a sectional view of a gas sprayer and a crucible apparatus provided in the metal powder manufacturing device according to the first embodiment of the present invention.
Figure 3:
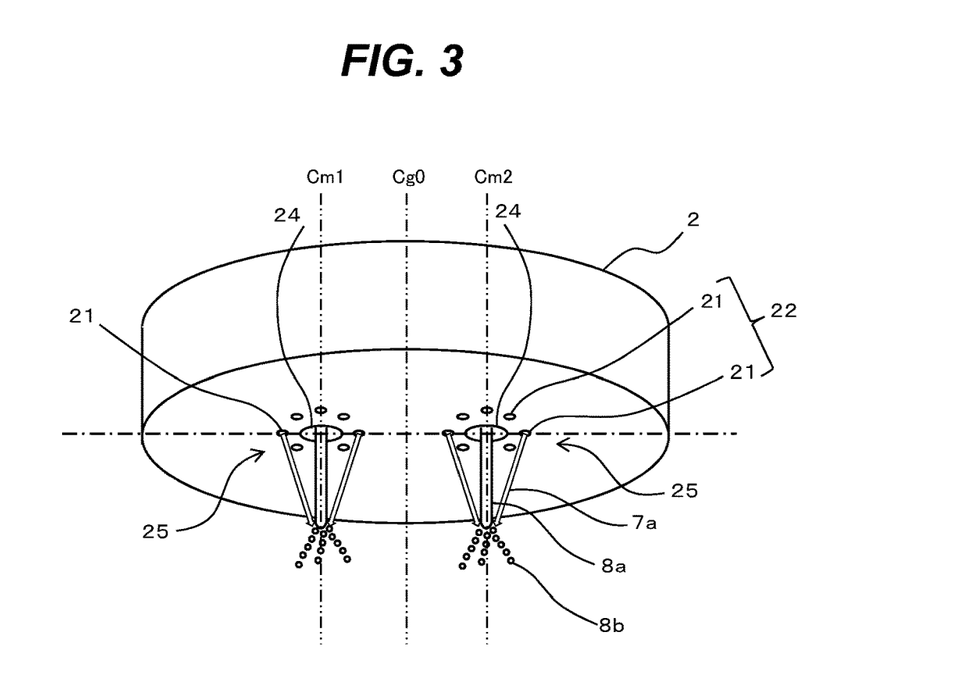
FIG. 3 is a perspective view of the gas sprayer provided in the metal powder manufacturing device according to the first embodiment of the present invention.

Embodiments of the present invention will be described below using the drawings.
—Overall Configuration of Metal Powder Manufacturing Device—
FIG. 1 is an overall configuration view of a gas atomizing device as a metal powder manufacturing device according to an embodiment of the present invention, FIG. 2 is a sectional view of a crucible apparatus and a gas sprayer according to the gas atomizing device of FIG. 1, and FIG. 3 is a perspective view of the gas sprayer. In FIG. 1, the gas atomizing device includes a solution tank 1, a gas sprayer 2, a spray gas supply pipe (spray fluid supply pipe) 3, an atomization tank 4, a collection hopper 5, and an exhaust pipe 6.

The solution tank 1 is a hermetically sealed vessel (closed chamber) held in a vacuum atmosphere or an inert gas atmosphere, and accommodates a crucible apparatus 10 therein. The crucible apparatus 10 has, as illustrated in FIG. 2, a crucible 11 in which a molten metal (melting metal) 8 (see FIG. 2) obtained by melting a solid metal (dissolved material) by heating is stored, and a plurality of molten metal nozzles 12 (in the illustrated example, two molten metal nozzles) that allows the molten metal 8 stored in the crucible 11 to flow downward into the atomization tank 4.

The gas sprayer 2 is an apparatus that sprays a high-pressure fluid (in the present embodiment, an inert gas) to atomization tank 4-side end parts of the plurality of molten metal nozzles 12 (also referred to as tip end parts of the molten metal nozzles 12), and pulverizes the molten metal flow (melting metal) 8a flowing downward from the molten metal nozzles 12 into a multiplicity of fine particles, to thereby atomize the melting metal into the atomization tank 4 (see FIG. 2). The gas sprayer 2 includes a plurality of spraying nozzles (also referred to as fluid spraying nozzles or gas spraying nozzles) 22 that sprays an inert gas 7 to the atomization tank 4-side end parts 12b of the plurality of molten metal nozzles 12, gas flow channels 23 that supplies the inert gas 7 to the plurality of spraying nozzles 22, and molten metal nozzle insertion holes 24 in which the molten metal nozzles 12 are inserted. The plurality of spraying nozzles 22 include a plurality of spraying holes 21 arranged in an annular pattern in the periphery of each of the plurality of molten metal nozzles 12, and spray the inert gas 7 to the atomization tank 4-side end part 12b of each molten metal nozzle 12.

Herein, the molten metal nozzles 12 and the spraying nozzles 22 including the plurality of spraying holes 21 provided in the periphery of the molten metal nozzles 12 are generically referred to as atomization nozzles 25. The atomization nozzle 25 in the present embodiment is a so-called confined type nozzle in which opening ends of a plurality of spraying holes 21 are disposed such as to surround the periphery of a tip end part of the molten metal nozzle 12, and a gas is sprayed from the plurality of spraying holes 21 (spraying nozzles 22) to the tip end part of the molten metal nozzle 12 to generate fine particles of metal. The confined type nozzle is characterized in that since the distance from the spraying holes 21 to the molten metal flow is very small, attenuation of the gas velocity until collision against the molten metal flow is small, which is excellent in fine particle formation property. In addition, as depicted in FIGS. 2 and 3, the metal powder manufacturing device according to the present embodiment includes two atomization nozzles 25. The plurality of atomization nozzles 25 include one molten metal nozzle 12 and the spraying nozzle 22 including a plurality of spraying holes 21 provided in the periphery of the molten metal nozzle 12. Note that the illustration is merely an example, and the number of the atomization nozzles 25 may be one, or may be three or more.

The spray gas supply pipe 3 is a piping for injecting an inert gas into the gas sprayer 2, and is connected to the gas flow channels 23 in the gas sprayer 2.

The atomization tank 4 is a vessel held in an inert gas atmosphere, and is a vessel in which the liquid metal of the fine particle form (metal particles) 8b atomized by the gas sprayer 2 is solidified by rapid cooling during falling. Note that the atomization tank 4 is a cylindrical vessel having the same diameter at upper and intermediate parts, but its lower part is tapered such that the diameter decreases in going closer to the collection hopper 5 from the viewpoint of ease of recovery of the metal powder.

The collection hopper 5 is an apparatus for recovering the powdery solid metal solidified during falling in the atomization tank 4, and is provided at a bottom part of the atomization tank 4.

The exhaust pipe 6 is a piping for discharging the inert gas filling up the atomization tank 4 and the collection hopper 5 from the collection hopper 5, and is connected to the collection hopper 5.

—Gas Sprayer 2—

The gas sprayer 2 is provided with molten metal nozzle insertion holes 24 as two cylindrical through-holes, and each of the two molten metal nozzles 12 are inserted in each of the two molten metal nozzle insertion holes 24. The molten metal 8 in the solution tank 1 flows down through holes 12a inside the molten metal nozzles 12 as a molten metal flow 8a, and is discharged into the atomization tank 4. As the minimum inside diameter of the molten metal nozzle 12 (the diameter of the orifice part 12d described later) that contributes to the magnitude of the diameter of the molten metal 8 made to flow downward to the gas sprayer 2, a value smaller than a conventional value, for example, a value of equal to or smaller than 3 mm can be selected.

The gas sprayer 2 has the high-pressure inert gas 7 (hereinafter referred to as high-pressure gas) injected thereinto from the spray gas supply pipe 3 connected to a gas suction hole (not illustrated) provided in a side surface, and sprays the high-pressure gas as an oriented spray gas jet (spray gas 7a) through the spray nozzle 22 (spraying holes 21) provided at a cylindrical bottom surface. The spray gas 7a is sprayed to the molten metal flow 8a made to flow downward from the molten metal nozzle 12. The molten metal flow 8a is pulverized into a multiplicity of fine particles 8b by collision on a reverse conical fluid film formed by the spray gas 7a in the vicinity of a focus of the spray gas 7a sprayed from the spraying nozzle 22. The metal made into mist-like fine particles 8b by the spray gas 7a from the spraying nozzle 22 is solidified by rapid cooling during falling in the atomization tank 4, and is recovered by the collection hopper 5 as a multiplicity of metal powders.

First Embodiment

Details of the configuration of the molten metal nozzle 12 of the crucible apparatus 10 in the metal powder manufacturing device according to a first embodiment of the present invention will be described below using the drawings.

Figure 4:
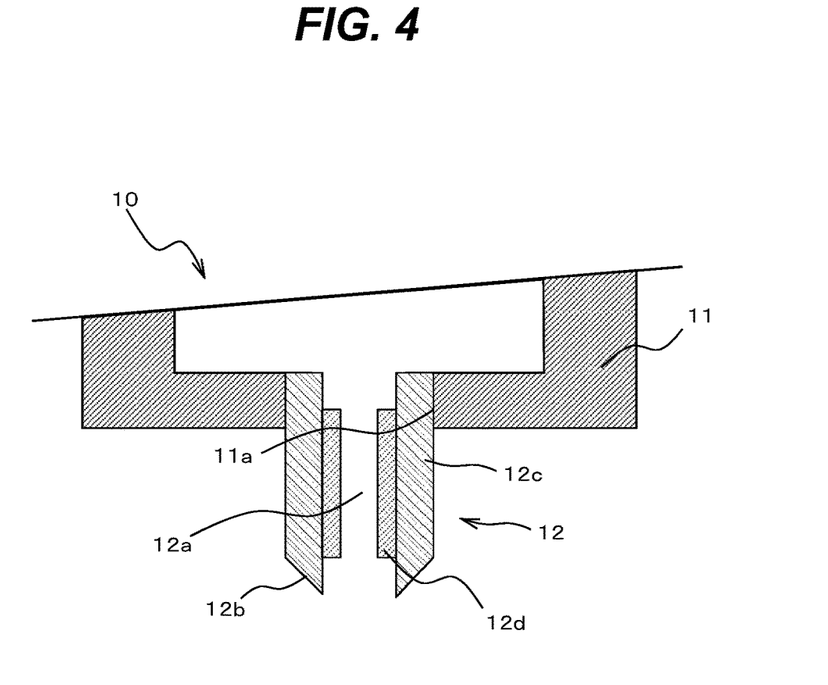
FIG. 4 is a sectional view of a crucible apparatus provided in the metal powder manufacturing device according to the first embodiment of the present invention.

FIG. 4 is a sectional view of the crucible apparatus 10 according to the first embodiment. Note that while the case where the crucible apparatus 10 is provided with the two molten metal nozzles 12 has been described in the description of the overall configuration of the metal powder manufacturing device conducted above using FIGS. 2 and 3, a case where the crucible apparatus 10 is provided with one molten metal nozzle 12 will be described in the following, for simplification of description. In addition, the same parts as those in the preceding figures are denoted by the same reference characters as used above and their descriptions may be omitted (the same applies also to the figures hereinbelow).

The crucible apparatus 10 of FIG. 4 is provided with the crucible 11 and the molten metal nozzle 12. The crucible 11 is an apparatus in which a melting metal (molten metal 8) obtained by melting a solid metal (dissolved material) by heating is stored, and is preferably formed from a material excellent in heat resistance, for example, alumina (aluminum oxide), magnesia (magnesium oxide), or zirconia (zirconium oxide). A bottom surface of the crucible 11 is formed with a nozzle fixing hole 11a that is a through-hole into which the molten metal nozzle 12 is inserted for fixation.

The molten metal nozzle 12 is an apparatus for allowing the molten metal (melting metal) 8 stored in the crucible 11 to flow downward into the atomization tank 4, and is fixed to the crucible 11 by an adhesive or the like in a state in which its upper end part (base end part) is inserted in the nozzle fixing hole 11a.

In addition, the molten metal nozzle 12 includes a molten metal nozzle body 12c, and the orifice part 12d having an inside diameter equal to or smaller than the inside diameter of the molten metal nozzle body 12c. The orifice part 12d and the molten metal nozzle body 12c are formed from different materials, and the material of the orifice part 12d is harder than the material of the molten metal nozzle body 12c. In other words, the orifice part 12d is formed from a material relatively harder than the material of the molten metal nozzle body 12c, and the molten metal nozzle body 12c is formed from a material relatively softer than the material of the orifice part 12d.

The molten metal nozzle body 12c is a cylindrical nozzle having an upper end part (base end part) inserted and fixed in the nozzle fixing hole 11a of the crucible 11, and is formed from a material relatively soft and having resistance to thermal shock compared with the material of the orifice part 12d, for example, silicon nitride, boron nitride, silica or the like. The molten metal nozzle body 12c depicted in FIG. 4 has a tip end part sharpened in a reverse truncated conical shape, but the shape of the tip end part of the molten metal nozzle body 12c is not limited to this shape.

The orifice part 12d is an annular member that has an inside diameter equal to or smaller than the inside diameter of the molten metal nozzle body 12c for controlling the flow rate of the molten metal 8, and that is fixed to the inside of the molten metal nozzle body 12c by an adhesive or the like. The orifice part 12d is formed from a material relatively harder and better in abrasion resistance than the material of the molten metal nozzle body 12c, for example, alumina, zirconia, silicon carbide or the like.

The orifice part 12d of FIG. 4 is a cylindrical member (tubular member) having an outside diameter substantially equal to the inside diameter of the molten metal nozzle body 12c, and is fixed to the inside of the molten metal nozzle body 12c. An atomization tank 4-side end part (lower end part), in the axial direction, of the orifice part 12d is located above an atomization tank 4-side end part (lower end part), in the axial direction, of the molten metal nozzle body 12c, and a crucible 11-side end part (upper end part) in the axial direction of the orifice part 12d is located below a crucible 11-side end part (base end part or upper end part), in the axial direction, of the molten metal nozzle body 12c.

Figure 7:
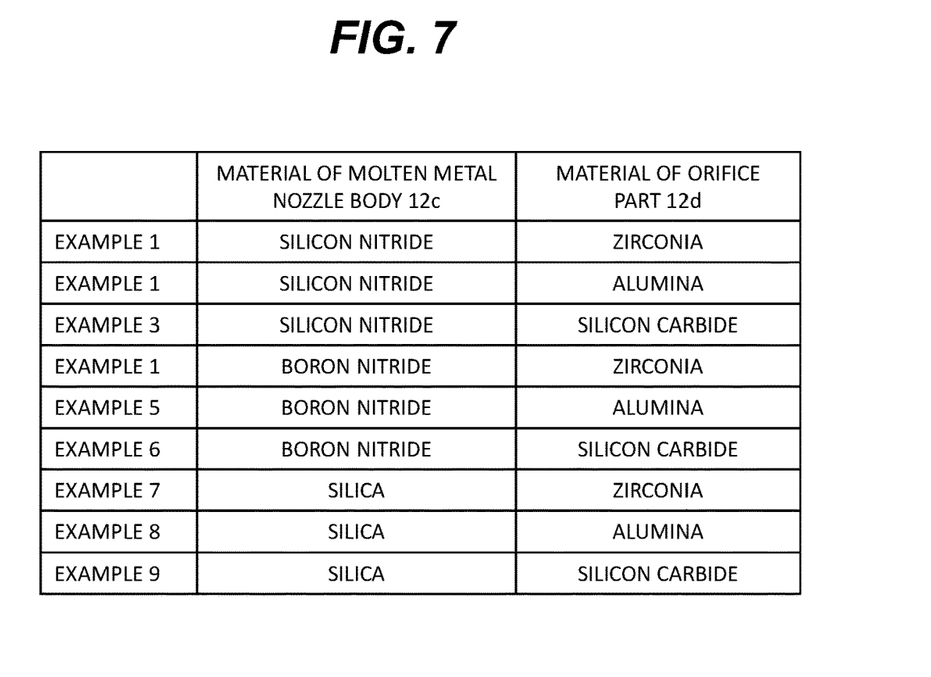
FIG. 7 is a table depicting the combination of materials of a molten metal nozzle body and an orifice part of the crucible apparatus provided in the metal powder manufacturing device according to the first embodiment of the present invention.

In general, a softer material tends to have resistance to thermal shock, and a harder material tends to be better in abrasion resistance. Therefore, a material relatively softer than the orifice part 12d is preferably utilized as the material of the molten metal nozzle 12c, and a material relatively harder than the molten metal nozzle 12c is preferably utilized as the material of the orifice part 12d. More specifically, a material having a thermal shock resistance by falling in water (JIS R1648) of equal to or more than 500° C. is preferably utilized as the material of the molten metal nozzle body 12c, and a material having a Vickers hardness (JIS R1610) of equal to or more than 10 GPa is preferably utilized as the material of the orifice part 12d. FIG. 7 sets forth examples of the combination of the materials of the molten metal nozzle body 12c and the orifice part 12d that satisfy this condition. In other words, examples of preferred combination of the materials of the molten metal nozzle body 12c and the orifice part 12d include silicon nitride and zirconia (Example 1), silicon nitride and alumina (Example 2), silicon nitride and silicon carbide (Example 3), boron nitride and zirconia (Example 4), boron nitride and alumina (Example 5), boron nitride and silicon carbide (Example 6), silica and zirconia (Example 7), silica and alumina (Example 8), and silica and silicon carbide (Example 9).

—Conventional Problems—

Figure 5:
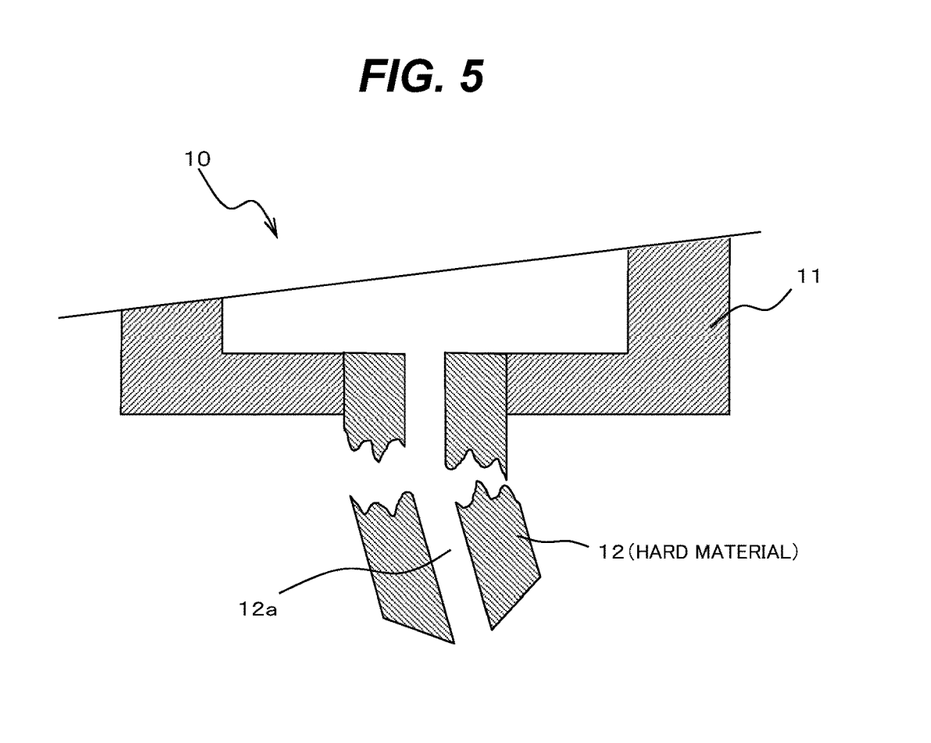
FIG. 5 is a sectional view of the crucible apparatus formed from a material that is sensitive to thermal shock (hard material).
Figure 6:
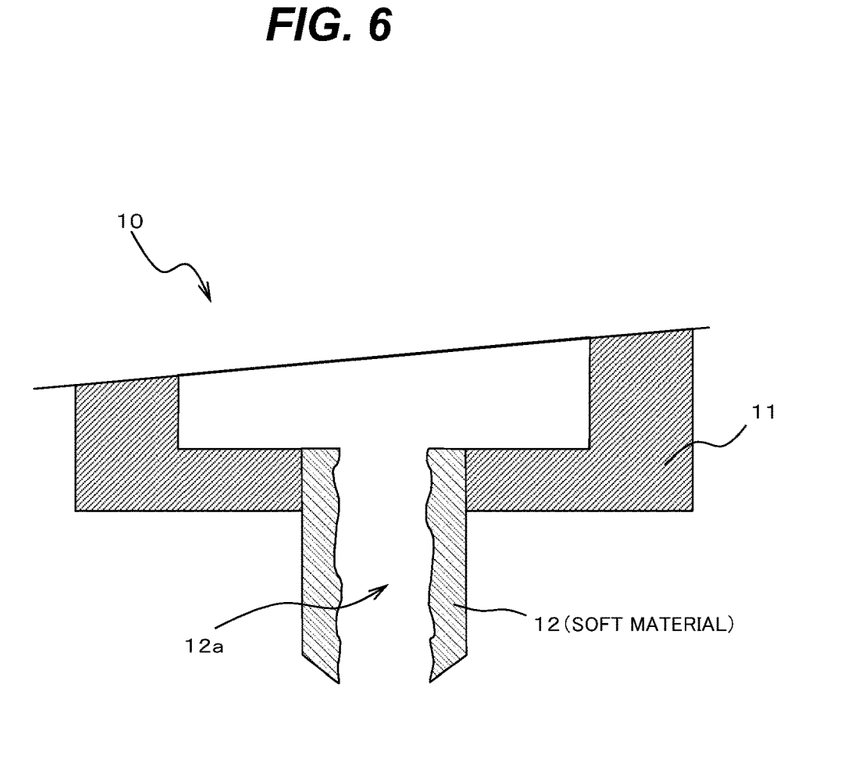
FIG. 6 is a sectional view of a crucible apparatus in which a molten metal nozzle formed of a material poor in abrasion resistance (soft material) is used.

Here, the problem involved in the conventional molten metal nozzle will be confirmed, and, thereafter, the effect of the metal powder manufacturing device according to the present embodiment will be described. FIG. 5 is an illustration of a problem when the molten metal nozzle is manufactured by use of a single material (for example, a ceramic) that is hard and excellent in abrasion resistance but is poor in thermal shock resistance, and FIG. 6 is an illustration of a problem when the molten metal nozzle is manufactured by using a single material (for example, boron nitride) that is soft and excellent in thermal shock resistance but is poor in abrasion resistance.

In general, the molten metal nozzle of a metal powder manufacturing device based on an atomizing method is manufactured from a single material. For example, a comparatively soft material such as boron nitride (BN) has resistance to a shock-form thermal stress (thermal shock) due to a sudden temperature change upon pouring of the molten metal, and, therefore, there is no fear of molten metal leakage. However, since the material is liable to be abraded by contact with the molten metal, continued use thereof may result in an enlargement of the diameter of the orifice part (the inside diameter 12a of the molten metal nozzle body), as depicted in FIG. 6, and an increase in the molten metal flow rate from an initial value, whereby the particle diameter of the metal powder may be enlarged. In contrast, a comparatively hard material such as a ceramic is excellent in abrasion resistance, and is characterized in that the diameter of the orifice part can be maintained even upon repeated contact with the molten metal. However, the material is liable to be damaged by thermal shock upon pouring of the molten metal, and it is difficult to overcome a fear of generation of molten metal leakage due to damage of the molten metal nozzle as depicted in FIG. 5. In addition, when not a free fall type atomization nozzle but a confined type atomization nozzle including a gas spraying nozzle for pulverizing a melting metal by spraying a high-pressure gas to the tip end of the molten metal nozzle is utilized as the atomization nozzle of the metal powder manufacturing device by the atomizing method, the gas sprayed from the gas spraying nozzle cools the tip end of the molten metal nozzle. For this reason, in the confined type atomization nozzle, the distribution of thermal stress in the molten metal nozzle is liable to be uneven as compared to the free fall type atomization nozzle, thus countermeasure against thermal shock is more important than in the prior art.

—Effect—

In view of such a problem, in the metal powder manufacturing device according to the present embodiment that is configured as aforementioned, the molten metal nozzle 12 includes the molten metal nozzle body 12c and the orifice part 12d having an inside diameter equal to or smaller than the inside diameter of the molten metal nozzle body 12c, and the material of the orifice part 12d is selected to be harder than the material of the molten metal nozzle body 12c. With the molten metal nozzle 12 formed in this way, the member disposed in an environment of friction with the molten metal flow 8a during metal powder manufacture is mainly the orifice part 12d which is comparatively hard and excellent in abrasion resistance, thus the inside diameter of the orifice part 12d can be prevented from being enlarged even upon continued use, and it is easy to maintain the diameter of the molten metal flow 8a. In addition, since the orifice part 12d is covered by, and located inside of, the molten metal nozzle body 12c, the orifice part 12d does not make direct contact with the gas sprayed from the spraying nozzle 22, and since the orifice part 12d is disposed in an environment of being heated mainly by only the molten metal flow 8a, thermal stress distribution is more uniformized and possibility of damage can be reduced as compared to the prior art. In contrast, since the molten metal nozzle body 12c is formed of a material which is comparatively soft and excellent in thermal shock resistance, the molten metal nozzle body 12c is not easily damaged even when utilized in an environment of being able to perform heat exchange with both a comparatively low temperature matter such as the gas from the spraying nozzle 22 and the inert gas in the atomization tank 4 and a comparatively high temperature matter such as the molten metal in the crucible 11 and the molten metal flow in the molten metal nozzle 12. Therefore, according to the present embodiment, thermal shock resistance and abrasion resistance of the confined type atomization nozzle (molten metal nozzle) can be enhanced, whereby a metal powder having a stable particle diameter distribution can be manufactured in a continued manner.

Particularly, in the present embodiment, an atomization tank 4-side end part (lower end part), in the axial direction, of the orifice part 12d is located above an atomization tank 4-side end part (tip end part or lower end part), in the axial direction, of the molten metal nozzle body 12c; therefore, the orifice part 12d can be prevented from being cooled by the gas sprayed from the spraying nozzle 22, whereby the possibility of damaging of the orifice part 12d by thermal shock can be lowered. In addition, a crucible 11-side end part (upper end part), in the axial direction, of the orifice part 12d is located below a crucible 11-side end part (base end part or upper end part), in the axial direction, of the molten metal nozzle body 12c; therefore, the orifice part 12d can be prevented from being heated by the molten metal which is at the highest temperature in the crucible 11, whereby the possibility of damaging of the orifice part 12d by thermal shock can be lowered.

Note that a minimum inside diameter of the orifice part 12d may be coincident with a minimum inside diameter of the molten metal nozzle body 12c. When the molten metal nozzle 12 is configured in this way, although there is a possibility that the molten metal nozzle body 12c makes contact with the molten metal flow 8a and is abraded in the beginning of use, the contact with the molten metal flow 8a is not generated after the abrasion proceeds to a certain extent, with the result that the minimum inside diameter of the orifice part 12d can become smaller than the minimum inside diameter of the molten metal nozzle body 12c.

Second Embodiment

Next, a metal powder manufacturing device according to a second embodiment of the present invention will be described below using the drawings.

Figure 8:
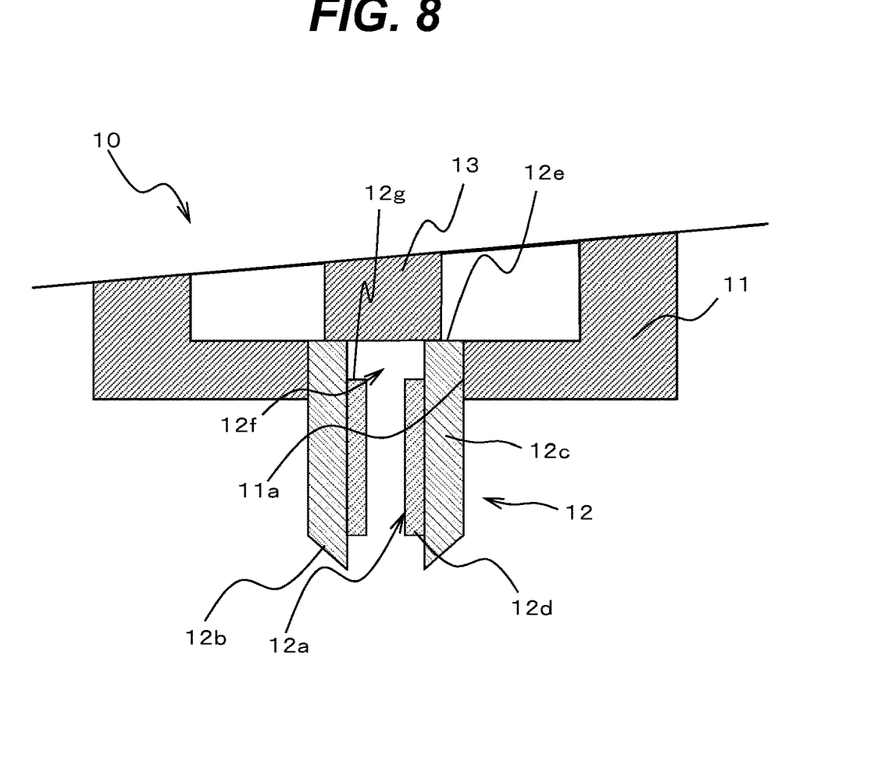
FIG. 8 is a sectional view of a crucible apparatus and a stopper of a metal powder manufacturing device according to a second embodiment of the present invention.

FIG. 8 is a sectional view of a crucible apparatus of the metal powder manufacturing device according to the second embodiment. The present embodiment differs from the first embodiment in that the metal powder manufacturing device (crucible apparatus 10) further includes a stopper 13 which is supported such as to be movable upward and downward within the crucible 11, makes contact with a crucible 11-side end part 12e of the molten metal nozzle body 12c at a lowered position, and closes a crucible 11-side opening 12f of the molten metal nozzle 12, and that the material of the stopper 13 is harder than the material of the molten metal nozzle body 12c (the material of the molten metal nozzle body 12c is softer than the material of the stopper 13).

The stopper 13 is a rod-shaped member of a heat-resistant hard material (for example, a ceramic) extending substantially in the vertical direction, and a driving mechanism (not illustrated) for moving the stopper 13 upward and downward is attached to the stopper 13. When the stopper 13 is moved downward by the driving mechanism to bring the tip end (lower end) of the stopper 13 into contact with the crucible 11-side end part 12e of the molten metal nozzle body 12c (the base end part of the molten metal nozzle body 12c), the crucible 11-side opening 12f of the molten metal nozzle 12 is closed, and flow-out of the molten metal 8 in the crucible 11 is stopped. Conversely, when the stopper 13 is moved upward by the driving mechanism to space the tip end of the stopper 13 from the crucible 11-side opening 12f of the molten metal nozzle 12, the crucible 11-side opening 12f of the molten metal nozzle 12 is opened into the crucible 11, thus the molten metal in the crucible 11 can be made to flow downward into the molten metal nozzle 12.

In the metal powder manufacturing device (the crucible apparatus 10) according to the present embodiment configured as aforementioned, the material of the molten metal nozzle body 12c is a material (for example, silicon nitride) softer than the material of the stopper 13, and, therefore, the crucible 11-side end part 12e of the molten metal nozzle body 12c (the base end part of the molten metal nozzle body 12c) can easily make close contact with the tip end (lower end) of the stopper 13 making contact therewith, thus the molten metal 8 in the crucible 11 can be prevented from leaking into the molten metal nozzle 12.

Note that in the present embodiment, the material of the molten metal nozzle body 12c is softer than the material of the stopper 13, and the stopper 13 is brought into contact with the crucible 11-side end part 12e of the molten metal nozzle 12, to thereby close the crucible 11-side opening 12f of the molten metal nozzle 12. Alternatively, the material of the stopper 13 may be softer than the material of the orifice part 12d, and the stopper 13 may be brought into contact with a crucible 11-side end part 12g of the orifice part 12d, to thereby close the crucible 11-side opening 12f of the molten metal nozzle 12. In addition, while the shape of the lower end of the stopper 13 depicted in FIG. 8 has a rectangular section, the shape of the lower end of the stopper may be a curved line-shaped section or may be a shape having other section.

Third Embodiment

Next, a metal powder manufacturing device according to a third embodiment of the present invention will be described below using the drawings.

Figure 9:
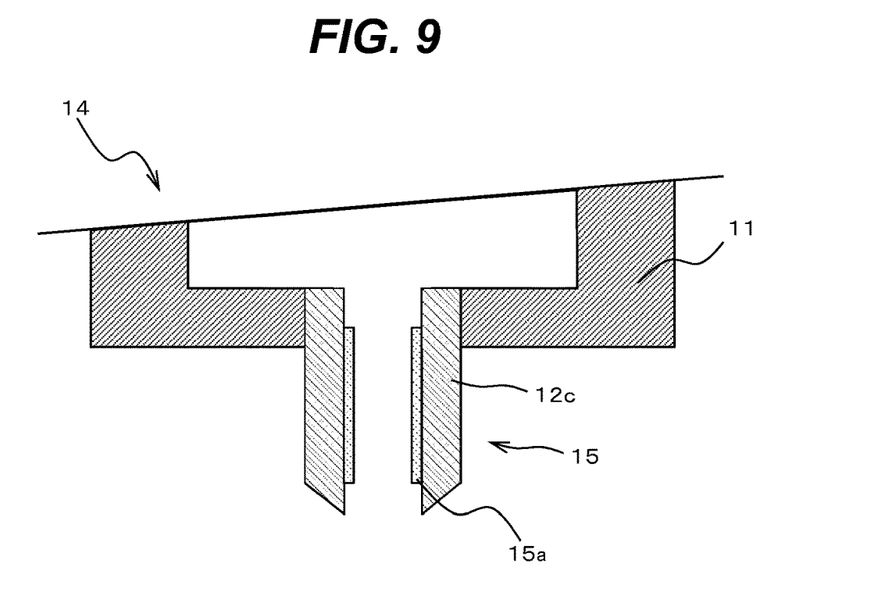
FIG. 9 is a sectional view of a crucible apparatus of a metal powder manufacturing device according to a third embodiment of the present invention.

FIG. 9 is a sectional view of a crucible apparatus 14 of the metal powder manufacturing device according to the third embodiment. The present embodiment differs from the first embodiment mainly in that an orifice part 15a is a member that is coated in an annular shape on an inside surface of a molten metal nozzle body 12c.

Examples of a method of manufacturing a molten metal nozzle 15 including the orifice part 15a in such a film form include a method in which a material comparatively harder and better in abrasion resistance than the material of the molten metal nozzle body 12c of the first embodiment is applied or sprayed to the inner peripheral surface of the molten metal nozzle body 12c. In the other points, the present embodiment is the same as the first embodiment. In other words, the molten metal nozzle 15 according to the present embodiment includes the molten metal nozzle body 12c formed of a material having resistance to thermal shock, and the orifice part 15a formed of a material which is high in hardness and excellent in abrasion resistance, like in the first embodiment.

When the molten metal nozzle 15 is formed in this way, an effect that the molten metal nozzle 15 can be easily manufactured can be exhibited, in addition to the effect of the first embodiment.

Fourth Embodiment

Next, a metal powder manufacturing device according to a fourth embodiment of the present invention will be described below using the drawings.

Figure 10:
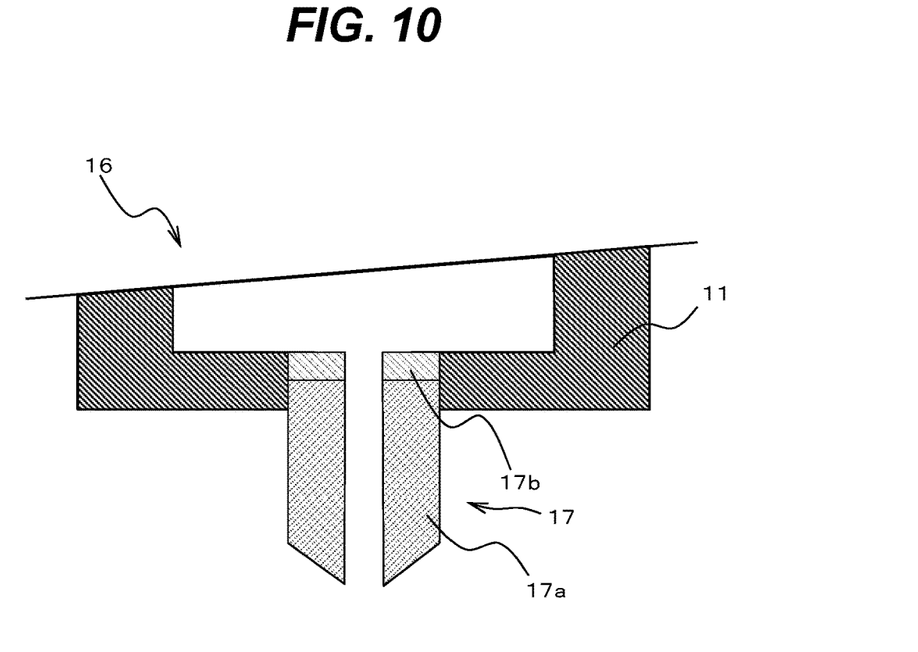
FIG. 10 is a sectional view of a crucible apparatus of a metal powder manufacturing device according to a fourth embodiment.

FIG. 10 is a sectional view of a crucible apparatus 16 of the metal powder manufacturing device according to the fourth embodiment. The present embodiment differs from the first embodiment mainly in that an orifice part 17b is located above a molten metal nozzle body 17a, and is supported by an upper end part (a crucible 11-side end part (upper end surface)) of the molten metal nozzle body 17a. In other words, as depicted in FIG. 10, the upper end part of the molten metal nozzle body 17a and the orifice part 17b are inserted in a nozzle fixing hole 11a of the crucible 11, the upper end part of the molten metal nozzle body 17a is fixed to the nozzle fixing hole 11a of the crucible 11 by an adhesive or the like, and a lower end part of the orifice part 17b is supported by the upper end part of the molten metal nozzle body 17a. Note that the orifice part 17b has an inside diameter equal to or smaller than the inside diameter of the molten metal nozzle body 17a, and is formed of a material harder and better in abrasion resistance than the material of the molten metal nozzle body 12c, like the orifice part 12d in the first embodiment.

According to the present embodiment, the orifice part 17b is supported by the upper end part of the molten metal nozzle body 17a, and, therefore, the orifice part 17b can be prevented from dropping off from a molten metal nozzle 17. Note that it is natural that the molten metal nozzle 17 in the present embodiment can exhibit an effect similar to the effect of the molten metal nozzle 12 in the first embodiment.

Note that the orifice part 17b may be fixed to the nozzle fixing hole 11a of the crucible 11 or the upper end part of the molten metal nozzle body 17a by an adhesive or the like, or the fixation by an adhesive or the like may be avoided and the orifice part 17b may be attachable to and detachable from the nozzle fixing hole 11a of the crucible 11 or the upper end part of the molten metal nozzle body 17a. In the latter case, it is easy to exchange to an orifice part 17b different in inside diameter according to the particle diameter of the metal powder desired, and, therefore, the efficiency of manufacturing metal powders of different particle diameters can be enhanced.

Figure 11:
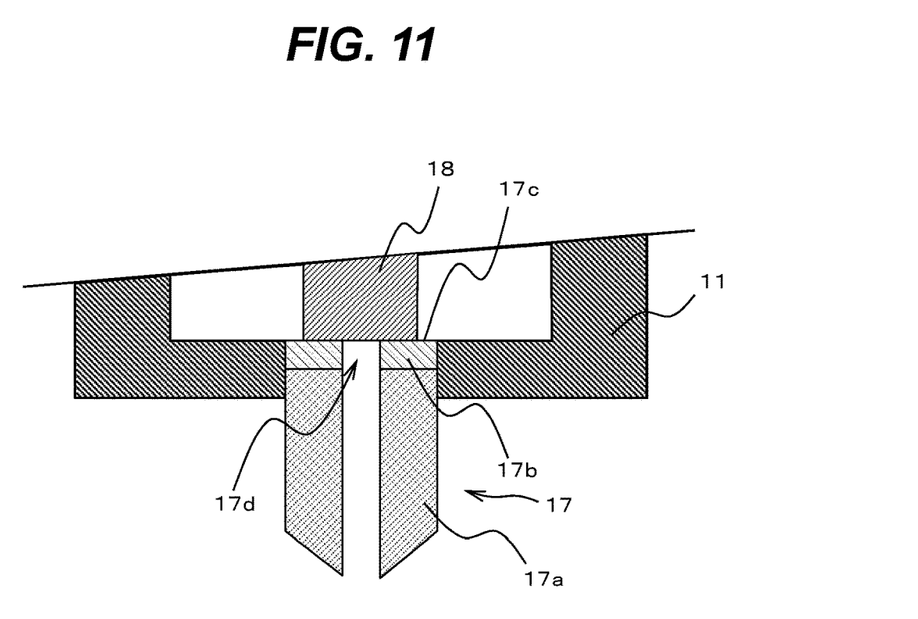
FIG. 11 is a sectional view of the crucible apparatus and a stopper of the metal powder manufacturing device according to the fourth embodiment of the present invention.

In addition, a stopper 18 of a material softer than the material of the orifice part 17b, as described in FIG. 11, may be additionally provided to the metal powder manufacturing device in the present embodiment. The stopper 18 can make contact with a crucible 11-side end part 17*c* of the orifice part 17*b*, and can close a crucible 11-side opening 17*d* of the molten metal nozzle 17. In this case, since the material of the stopper 18 is a material (for example, silicon nitride) softer than the material of the orifice part 17*b*, the tip end (lower end) of the stopper 18 can make close contact with the crucible 11-side end part 17*c* of the orifice part 17*b* making contact therewith, and can prevent the molten metal 8 in the crucible 11 from leaking through the contact part.

<Others>

The present invention is not limited to the above-described embodiments, but includes various modifications within such ranges as not to depart from the gist of the invention. For example, the present invention is not limited to a configuration including all the configurations described in each of the above embodiments, but includes a configuration in which part of the configurations is omitted. In addition, a part of the configuration according to an embodiment may be added to or used to substitute the configuration according to other embodiment.

While a case where one molten metal nozzle 12 is provided at the bottom surface of the crucible 11 has been described in the above-described embodiments, the number of the molten metal nozzles 12 provided at the bottom surface of the crucible 11 is not limited to one, but may be two or may be three or more. In this case, the plurality of spraying nozzles 22 are provided in each of the peripheries of the molten metal nozzles 12, 15, and 17, and spray a spray gas 7*a* to the molten metal flow 8*a* flowing downward from each of the molten metal nozzles 12.

Figure 12:
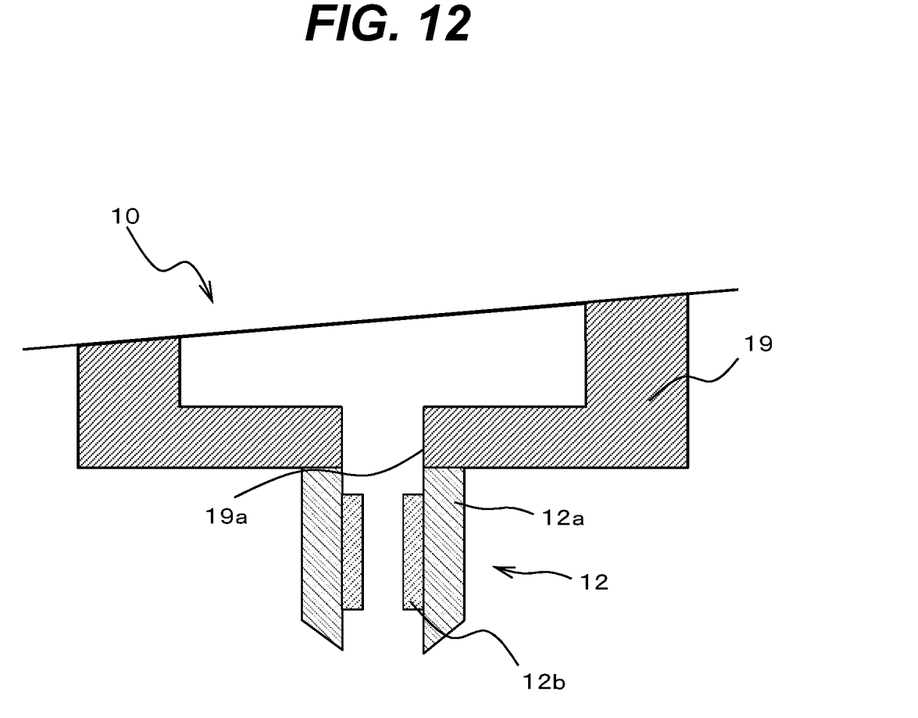
FIG. 12 is a sectional view of a crucible apparatus provided in a metal powder manufacturing device according to another embodiment.

In addition, while an example in which the molten metal nozzle 12, 15, 17 is inserted and fixed in the nozzle fixing hole 11*a* of the crucible 11 has been depicted, the molten metal nozzle 12, 15 may be fixed to the bottom surface of the crucible 19 by an adhesive or the like such that a through-hole 19*a* and the inside of the molten metal nozzle 12, 15 communicate with each other, as depicted in FIG. 12.

Besides, while the so-called gas atomizing device in which a gas (inert gas 7) is sprayed from the spraying nozzle 22 has been described above, the present invention is applicable to any atomizing device in which a fluid is sprayed, inclusive of a water atomizing device in which water (liquid) is sprayed from the spraying nozzle 22, and is applicable further to a disk atomizing device.

DESCRIPTION OF REFERENCE CHARACTERS

1: Solution tank
2: Gas sprayer
3: Spray gas supply pipe
4: Atomization tank
5: Collection hopper
6: Exhaust pipe
7: Inert gas
7*a*: Spray gas
8: Molten metal
8*a*: Molten metal flow
8*b*: Fine particles
10: Crucible apparatus
11, 19: Crucible
11*a*: Nozzle fixing hole
12, 15, 17: Molten metal nozzle
12*c*, 17*b*: Molten metal nozzle body
12*d*, 15*a*, 17*a*: Orifice part
13, 18: Stopper
21: Spraying hole
22: Spraying nozzle
24: Molten metal nozzle insertion hole
25: Atomization nozzle

The invention claimed is:

1. A metal powder manufacturing device comprising:
   an atomization tank;
   a crucible in which a melting metal is stored;
   a molten metal nozzle that allows the melting metal stored in the crucible to flow downward into the atomization tank; and
   a fluid spraying nozzle including a plurality of spraying holes that spray a fluid to an atomization tank-side end part of the molten metal nozzle to pulverize the melting metal flowing downward from the molten metal nozzle,
   wherein
      the molten metal nozzle includes a molten metal nozzle body, and an orifice part having an inside diameter equal to or smaller than an inside diameter of the molten metal nozzle body,
      a material of the orifice part is harder than a material of the molten metal nozzle body, and
      an atomization tank-side end part of the orifice part, in an axial direction, is located above an atomization tank-side end part of the molten metal nozzle body, in the axial direction.

2. The metal powder manufacturing device according to claim 1, wherein
   the orifice part is an annular member fixed to inside of the molten metal nozzle body.

3. The metal powder manufacturing device according to claim 1, wherein
   the orifice part is a member formed by being coated in an annular shape on an inside surface of the molten metal nozzle body.

4. The metal powder manufacturing device according to claim 1, wherein
   the molten metal nozzle is a plurality of molten metal nozzles that allow the melting metal stored in the crucible to flow downward into the atomization tank, and
   the fluid spraying nozzle includes a plurality of spraying holes arranged in an annular pattern in a periphery of each of the plurality of molten metal nozzles.

5. The metal powder manufacturing device according to claim 1, wherein
   a crucible-side end part, in the axial direction, of the orifice part is located below a crucible-side end part, in the axial direction, of the molten metal nozzle body.

6. The metal powder manufacturing device according to claim 1, wherein
   an upper end part of the molten metal nozzle body and the orifice part are inserted in a nozzle fixing hole of the crucible.

7. The metal powder manufacturing device according to claim 6, wherein
   a lower end part of the orifice part is supported by the upper end part of the molten metal nozzle body.

8. The metal powder manufacturing device according to claim 7, wherein
   the orifice part is attachable to and detachable from the nozzle fixing hole of the crucible and the upper end part of the molten metal nozzle body.

9. A crucible apparatus for a metal powder manufacturing device comprising:
- a crucible in which a melting metal is stored; and
- a molten metal nozzle that allows the melting metal stored in the crucible to flow downward into an atomization tank, wherein
  - a fluid is sprayed from a fluid spraying nozzle including a plurality of spraying holes provided in a periphery of the molten metal nozzle to an atomization tank-side end part of the molten metal nozzle,
  - the molten metal nozzle includes a molten metal nozzle body and an orifice part having an inside diameter equal to or smaller than an inside diameter of the molten metal nozzle body,
  - a material of the orifice part is harder than a material of the molten metal nozzle body, and
  - an atomization tank-side end part of the orifice part, in an axial direction, is located above an atomization tank-side end part of the molten metal nozzle body, in the axial direction.

10. The crucible apparatus according to claim 9, wherein the orifice part is an annular member fixed to inside of the molten metal nozzle body.

11. The crucible apparatus according to claim 9, wherein the orifice part is a member formed by being coated in an annular shape on an inside surface of the molten metal nozzle body.

12. The crucible apparatus according to claim 9, wherein the molten metal nozzle is a plurality of molten metal nozzles that allow the melting metal stored in the crucible to flow downward into the atomization tank.

13. The crucible apparatus according to claim 9, wherein a crucible-side end part, in the axial direction, of the orifice part is located below a crucible-side end part, in the axial direction, of the molten metal nozzle body.

14. The crucible apparatus according to claim 9, wherein an upper end part of the molten metal nozzle body and the orifice part are inserted in a nozzle fixing hole of the crucible.

15. The crucible apparatus according to claim 14, wherein a lower end part of the orifice part is supported by the upper end part of the molten metal nozzle body.

16. The crucible apparatus according to claim 15, wherein the orifice part is attachable to and detachable from the nozzle fixing hole of the crucible and the upper end part of the molten metal nozzle body.

* * * * *